March 7, 1950

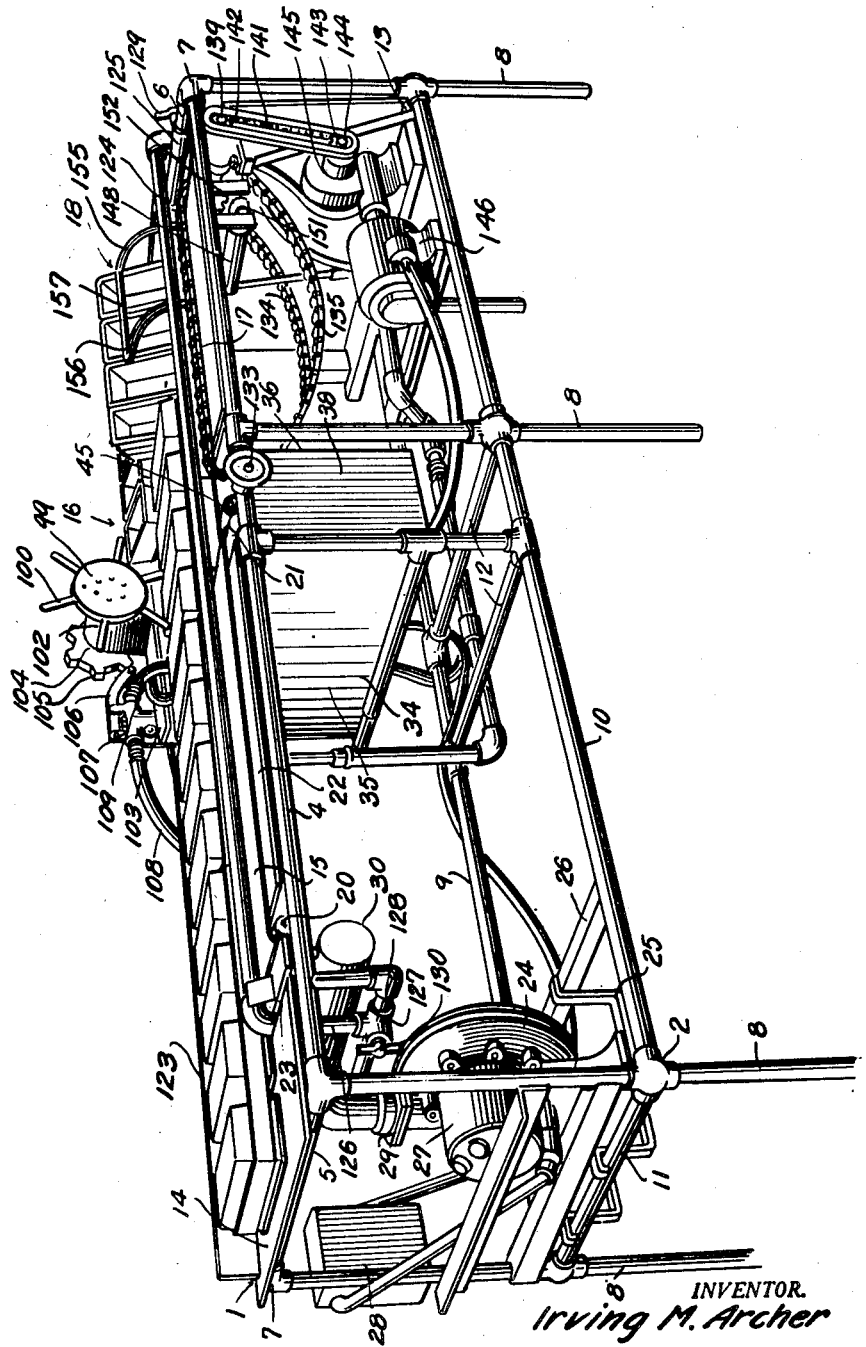

I. M. ARCHER 2,499,621

MACHINE FOR APPLYING A COATING TO THE INTERIOR OF PANS

Filed July 2, 1945

INVENTOR.
Irving M. Archer.
BY
Fishburn & Mullendore
ATTORNEYS

March 7, 1950
I. M. ARCHER
2,499,621
MACHINE FOR APPLYING A COATING TO THE INTERIOR OF PANS
Filed July 2, 1945
5 Sheets-Sheet 3
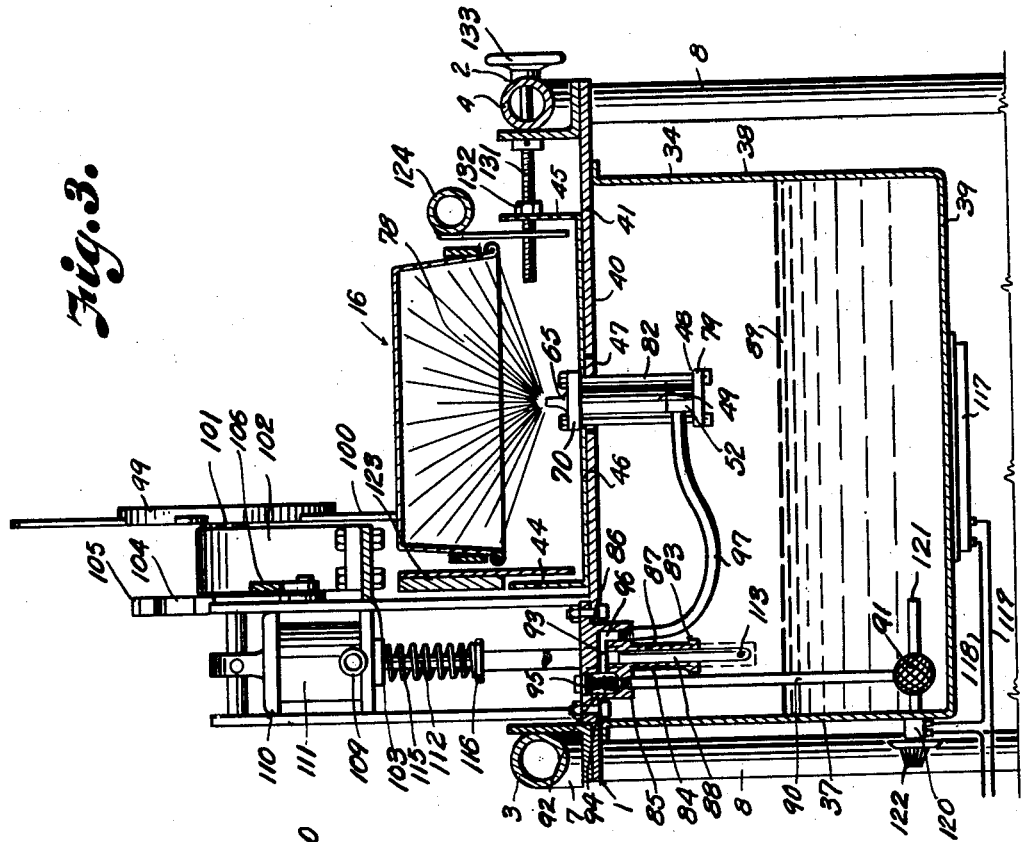
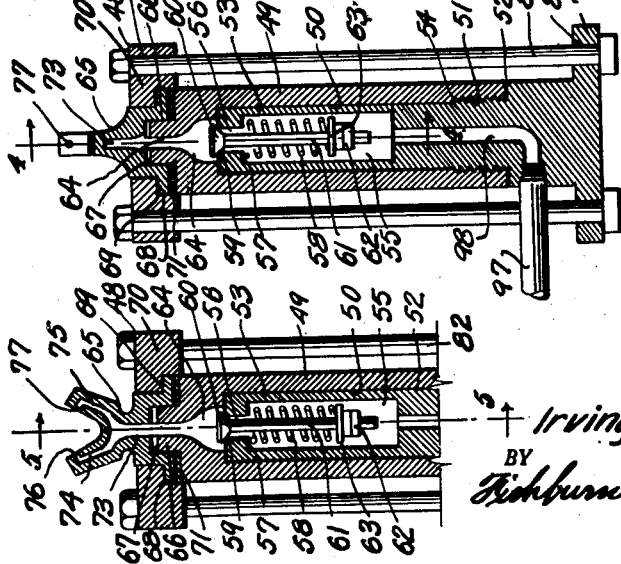
INVENTOR.
Irving M. Archer
BY
Fishburn + Mullendore
ATTORNEYS March 7, 1950
I. M. ARCHER
2,499,621
MACHINE FOR APPLYING A COATING TO THE INTERIOR OF PANS
Filed July 2, 1945
5 Sheets-Sheet 4
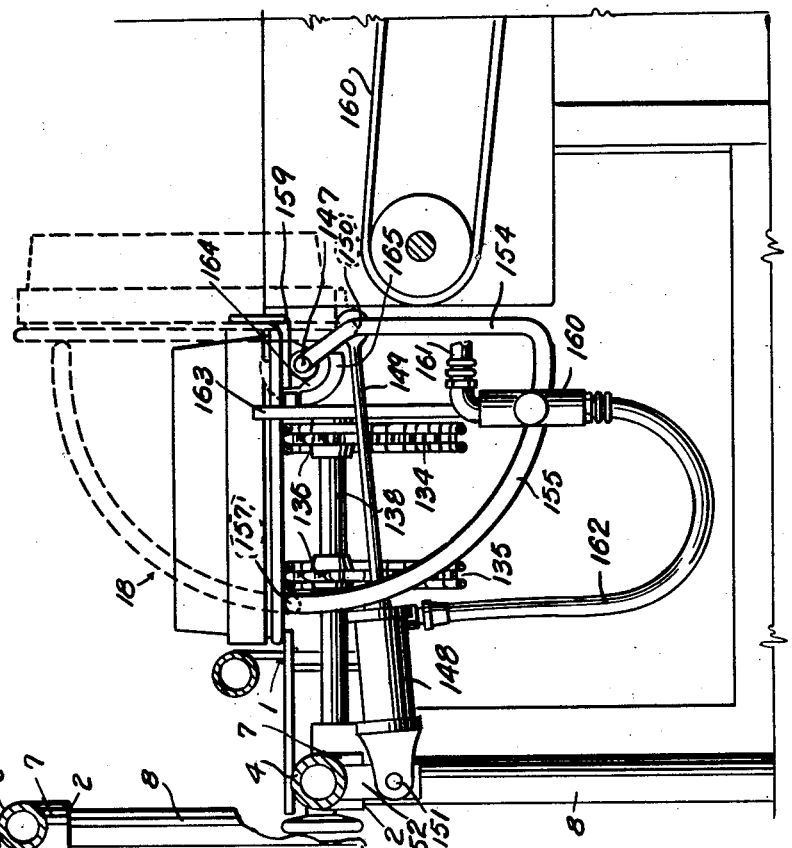
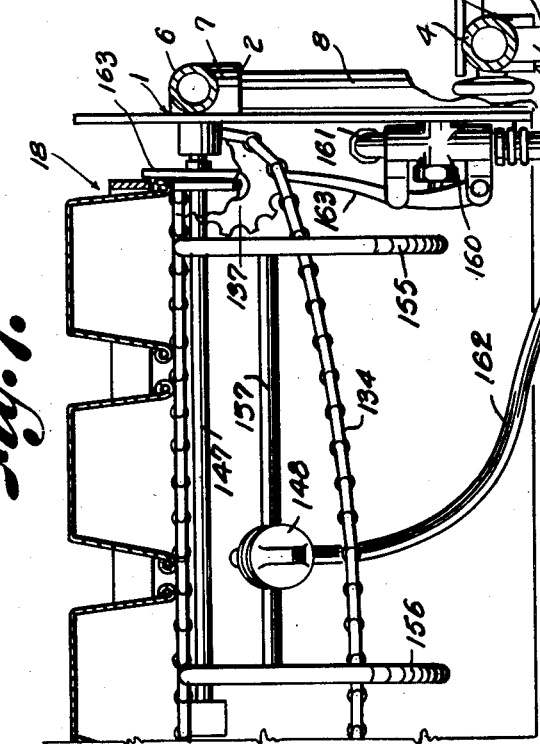
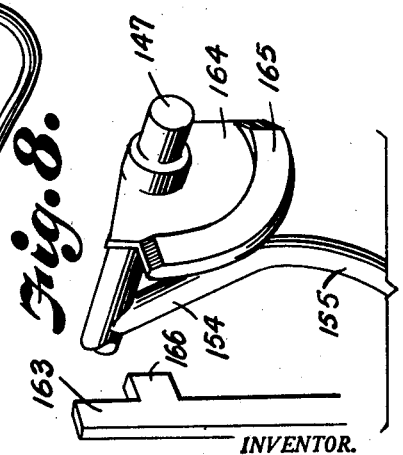
INVENTOR.
Irving M Archer
BY
Fishburn & Mullendore
ATTORNEYS

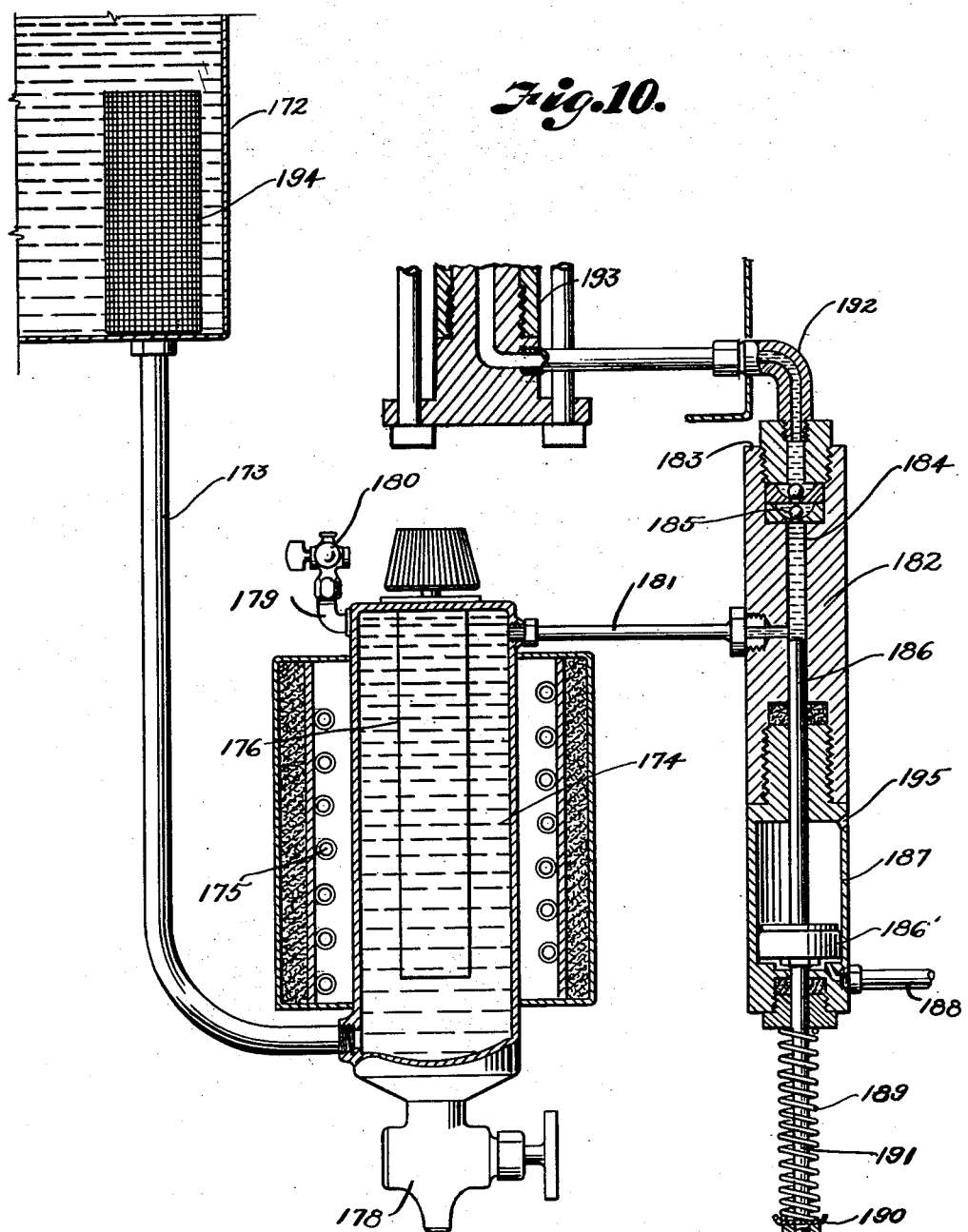

Patented Mar. 7, 1950 2,499,621

UNITED STATES PATENT OFFICE 2,499,621

MACHINE FOR APPLYING A COATING TO THE INTERIOR OF PANS

Irving M. Archer, Dallas, Tex., assignor to Campbell Taggert Research Corporation, Kansas City, Mo., a corporation of Missouri Application July 2, 1945, Serial No. 602,822

4 Claims. (Cl. 91—44)

1

This invention relates to a machine for applying a coating to the interior of pans; for example, those used in baking so as to prevent sticking of the contents, and has for its principal object to provide for sanitary and economical application of the coating material.

Other objects of the invention are to provide a machine that is automatic in operation; to provide a machine having capacity corresponding to modern pan filling methods; to provide for spray coating of pans in inverted position and for turning the pans to an upright position ready for filling; to provide a machine with means for effecting substantially uniform distribution of the coating material in the exact amount desired; to provide a machine constructed to conserve coating material and prevent escape thereof; to provide for automatic removal of any foreign matter from the pan prior to coating; and to provide a machine for coating pans that is comparatively simple and positive in operation.

It is also an object of the invention to provide a pan coating machine that handles the pans in rapid succession without battering or damaging the pans.

In accomplishing these and other objects of the invention, I have provided improved structure, the preferred form of which is illustrated in the accompanying drawings wherein:

Fig. 1 is a perspective view of a pan coating machine constructed in accordance with the present invention.

Fig. 3 is a cross section on the line 3—3 of Fig. 2.

Fig. 4 is a detailed sectional view through the spray nozzle with which the coating material is applied, the section being taken on the line 4—4 of Fig. 5.

Fig. 5 is a sectional view through the spray mechanism on the line 5—5 of Fig. 4.

Fig. 6 is a cross section through the machine particularly illustrating the mechanism for restoring the pans to upright position ready for delivery to a filling station.

Fig. 7 is a sectional view of the delivery end of the machine and which is a continuation of the section shown in Fig. 2.

Fig. 8 is a perspective view of a part of the pan turning mechanism particularly illustrating the detent for continuing application of power necessary to complete turning of the pans.

Fig. 10 is a diagrammatic view of a modified form of heating and spraying mechanism.

Figures 2, 9:
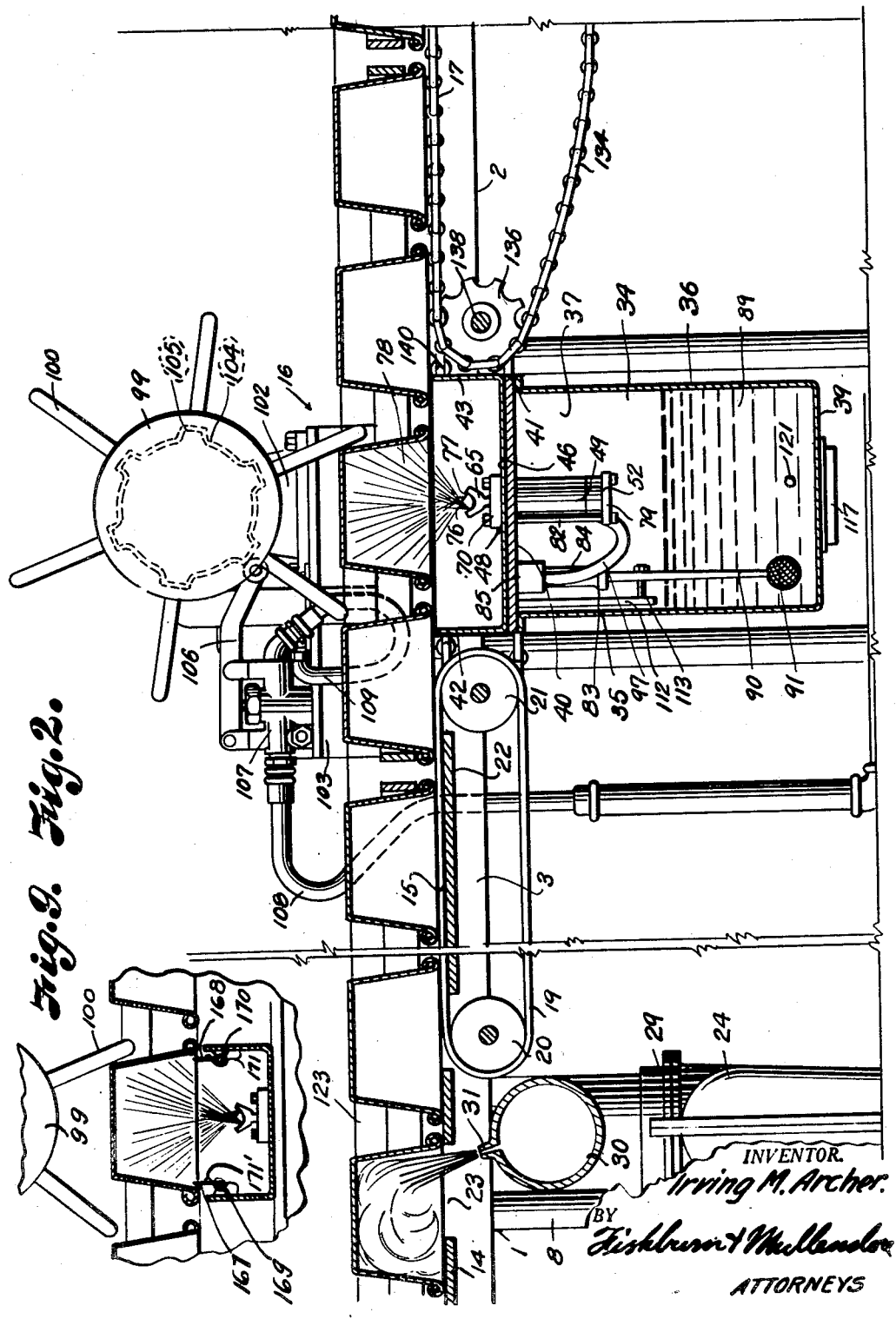
Fig. 2 is an enlarged longitudinal section through the machine particularly illustrating cleaning of the pans of foreign material and the spray application of the coating.
Fig. 9 is a fragmentary cross section showing yieldable flaps for closing space between the pans being coated and the coating collecting pan.

Referring more in detail to the drawings:

2

1 designates a pan coating machine constructed in accordance with the present invention and which includes a frame 2 that may be formed of pipe and pipe fittings, as illustrated, or similar structural members to provide the necessary support for the pan and necessary operating mechanism of the machine. In the illustrated instance, the frame 2 includes laterally spaced upper rails 3 and 4 connected by end rails 5 and 6 through fittings 7 which are mounted on the upper ends of legs 8. The legs 8 are also connected by longitudinal lower members 9 and 10 and transverse members 11, 12, and 13 (Fig. 1). Carried on the upper rails 3 and 4 of the frame adjacent the end rail 5 is a horizontally disposed plate or table top 14 for starting pans onto a conveyer 15 which carries the pans across a coating station 16 onto a discharge conveyer 17 that is associated with a pan turning mechanism generally indicated at 18.

In the illustrated instance the conveyer 15 includes an endless web or belt 19 operating over rollers 20 and 21 that are suitably journalled at the ends in bearings carried by the longitudinal rails 3 and 4. The upper run of the belt operates over a plate 22 also carried by the side rails and in position to support the upper run of the belt in plane with the plate 14. The plate 14 is provided with a transverse slot-like opening 23 adjacent the receiving end of the conveyer 15 and through which jets of air are discharged into the pans as they are moved thereacross as later described. The jets of air are provided by a blower 24 that is suitably mounted on brackets 25 that are carried by the transverse rail 11 and a secondary transverse rail 26. The blower 24 is actuated by a motor 27 connected therewith and energized under control of a switch mechanism indicated by the switch box 28 that is mounted on one of the adjacent legs 8 of the frame 2. The discharge connection 29 of the blower is connected with the end of a pipe 30 that is suspended below the slot-like opening 23 and has a series of discharge nozzles 31 through which the air is discharged into the pans for removing any foreign matter such as crumbs or the like that may be in the pans.

The pan coating mechanism includes a tank 34 having side and end walls 35—36 and 37—38 connected by a bottom 39. The top of the tank is open but when in position is closed by a transverse plate 40 extending transversely of the frame 2 and suitably supported at the ends from the side rails 3 and 4 at a sufficient distance below the upper run of the coneyer belt to accommodate a collecting pan 41 across which the pans are projected as later described. The pan 4 has side and end walls 42—43 and 44—45 connected by a bottom 46 supported directly on the transverse plate 40. The top of the pan is open and of a size to cover the largest size pan to be used in the coating machine. The pan has connection with the tank 34 such as an opening 47 for draining any excess coating material back into the tank for re-use. Supported by the pan 41 and depending into the tank is a spraying device 48, best illustrated in Figs. 4 and 5, whereby a measured amount of coating material is discharged into each baking pan. The spraying device includes a vertically arranged cylinder 49 having an axial bore 50 opening from the lower end thereof and threaded as at 51 to mount a valve unit 52 whereby a measured amount of spray material is caused to be substantially instantaneously discharged through the spray nozzle so that each pan is given a single shot of the coating material under sufficient force to effect substantially uniform distribution of the coating material over the inner surface of the pans.

The valve unit includes a housing 53 of a shape to be received in the bore 50 and having threads 54 for engaging the threads 51 to provide a leak-tight joint therebetween. The housing 53 has an axial bore 55 terminating at the upper end in an outlet opening 56 of smaller diameter to provide an internal shoulder 57 for seating one end of a valve spring 58. The opening 56 is encircled by a valve seat 59 for a valve 60 having a stem 61 projecting into the bore 55. The lower end of the valve stem is threaded to accommodate nuts 62 for supporting a spring seat 63 seating the opposite end of the spring 58 so that the spring normally retains the valve 60 in closed position until the pressure of the spray liquid on the spring side of the valve reaches a predetermined pressure whereupon the spring yields to allow sudden opening of the valve for discharge of spray material into a port 64 leading to the spray nozzle 65. The discharge port 64 extends through a boss 66 on the cylinder 49 to engage in a recess 67 of the spray nozzle to retain the spray nozzle in axial alignment with the port 64. The spray nozzle also has a laterally extending annular flange 68 corresponding in diameter to the cylinder 49 to provide a shoulder 69 to seat a clamping plate 70 that seats upon the bottom of the collecting pan. A suitable gasket 71 is inserted between the cylinder and the nozzle for assuring a liquid-tight seal therebetween under the pressure to which the spray liquid is discharged through the spray nozzle.

The spray nozzle has a channel 73 registering with the port 64 and which diverges into lateral and upwardly extending branches 74 and 75 that are formed in the nozzle body and which terminate at the ends in ports 76 and 77 arranged to discharge jets of the spray material opposite jets of the spray into impinging contact with each other so as to effect fanning thereof as indicated at 78 and effect substantial spread to cover the length and width of a pan moved into coating position as shown in Figs. 2 and 3. The impinging arrangement of the jets also provides for finer atomization of the coating material to insure the thinness of coating desired and thereby conserve the coating material and prevent excessive deposits on the interior of the pans. To insure leak-tight joints between the nozzle and the cylinder 49, the lower end of the cylinder has a lateral flange 79 corresponding to the clamping plate 70 and the plate and flange are provided with registering openings 80 and 81 to pass drawbolts 82 which when tightened draw the nozzle into pressure-tight contact with the gaskets 71.

Measured amounts of coating material are caused to be discharged through the valve by a pump mechanism 83 which includes a bracket 84 having a head portion 85 extending through an opening 86 in the plate 40 adjacent one end of the tank 34. The head portion 85 has a depending cylinder 87 reciprocably mounting a piston-like plunger 88 to draw in a charge of coating material 89 from the quantity contained in the tank 34 through a tube 90 that depends within the tank and carries a strainer 91 on the inlet end thereof. The upper end of the tube is threaded in the head portion 85 and connects with a check valve chamber 92 which in turn is connected with the piston chamber through a port 93. A ball type check valve 94 is mounted in the check valve chamber to seat in closing relation with the discharge end of the tube under action of a spring 95. A measured quantity of coating material is discharged through a port 96 which is connected by a tube 97 with a channel 98 leading to the valve chamber 55.

In order that the pump mechanism is operated in timed relation with positioning of a pan over the spray nozzle, the machine is provided with a timing mechanism actuated by movement of the pans and which includes a wheel 99 having radially extending fingers 100 spaced apart sufficiently to permit entrance of the bottom portion of the pan therebetween in the manner of the teeth of a rack and gear. The wheel 99 is supported in position over the path of the pans on a shaft 101 carried in a bracket 102 that is mounted on a frame 103 carried above the plate 40 adjacent one side of the machine as shown in Fig. 3. Also carried on the shaft preferably at the outer side of the bracket 102 is a cam wheel 104 having high lobe portions 105 spaced apart in accordance with the spacing of the fingers 100 for actuating a lever 106 of a valve 107, the valve 107 also being located on the frame 103 and is supplied with air under pressure through a flexible connection 108 and which upon each actuation of the lever 104 discharges air through a flexible connection 109 leading to an actuator 110. The actuator 110 is illustrated as including a cylinder 111 containing a piston (not shown) which actuates a rod 112 that is connected by a pin 113 with the lower end of the piston 88. The piston is actuated in the opposite direction upon release of air pressure in the valve by means of a coil spring 115 having one end engaging against the cylinder and the opposite end against a collar 116 on the rod 112.

With some types of coating material it is desirable to heat the tank and maintain the coating material at a constant temperature. This is effected by providing the bottom of the tank with an electric heater 117 supplied with current by conductors 118 and 119. Interposed in the conductor 118 is a thermostatically operated switch 120 having the thermostat element 121 thereof located within the coating material carried within the tank. The thermostat may be set to actuate the switch at any predetermined temperature by means of a knob 122 that is located exteriorly of the tank.

In order to provide a fixed path for movement of the pans and to center the pans over the spray nozzle, one end of the pans is guided by a rail 123 which extends parallel with the rail 3 and the opposite side is guided by a rail 124, the rail 124 being movable to and from the rail 123 according to the length of the pans. The rail 124 has a sleeve 125 at one end slidable on the end rail 6 and the other end terminates in a downwardly extending arm 126 carrying a sleeve 127 slidable on a rail 128 extending transversely of the frame below the rails 3 and 4. The sleeves are adjustably positioned along the guide rails by set screws 129 and 130 respectively.

In order that the collecting pan 41 and spray nozzle unit supported thereby may be adjusted relative to the path of the pans, the collecting pan is slidably positioned along its supporting plate by a threaded shaft 131 having fixed journals in the side rail 4 and which has threaded engagement with a nut 132 fixed to the adjacent end of the collecting pan as shown in Fig. 3. The shaft is actuated by a hand wheel 133 fixed to the journalled end of the shaft.

The delivery conveyer includes a spaced pair of belts 134 and 135 operating over pairs of sprockets 136 and 137 fixed to shafts 138 and 139 extending transversely of the machine and mounted in bearing brackets carried by the side rails 3 and 4 similar to the brackets for the conveyer previously described. The conveyers are interconnected by a chain 140 operating over sprockets (not shown) on the adjacent shafts of the respective conveyers, the power for moving the conveyers being applied to the shaft 139 through a chain 141 operating over a sprocket 142 on the shaft and a sprocket 143 on the power delivery shaft 144 of a speed reducer 145 (Fig. 1), the speed reducer being connected with a motor 146 so that when the motor is energized upon closing a switch (not shown) in the switch box 28, the conveyers are continuously operated.

Since the pans are moved across the spray nozzle in inverted position, means must be provided for turning the pans so that they are in an upright position ready to receive the contents to be placed therein. This is effected by providing a rock shaft 147 journalled adjacent the longitudinal rail 3 at the delivery end of the machine and which is actuated by an air cylinder 148 through a connecting rod 149 having pivotal connection with an arm 150 on the rock shaft. The air cylinder 148 is pivotally journalled as at 151 on a bracket 152 depending from the longitudinal rail 4. Fixed to the ends of the rock shaft 147 are depending arms 153 terminating in arcuate-shaped arms 155 and 156 which are interconnected by a cross bar 157 adapted to engage under the pans so as to raise the outer side of the pans and tip the pans across a supporting rail 159 onto a discharge belt 160 which may be the loading belt of a pan filling machine (not shown).

In order to effect actuation of the air cylinder 148 when a pan or group of pans is in position to be turned, the machine is provided with an air control valve 160 similar to the control valve previously described and which is supplied with air under pressure through a pipe 161 and which is discharged when the valve is open through a pipe 162 that is connected with the air cylinder 148 (Figs. 6 and 7). The valve has a lever arm 163 pivotally connected thereto and which has its opposite end extending upwardly into the path of the pans being carried by the conveyer chains (Figs. 6 and 7) so that when the endmost pan engages the lever, the lever is moved to open the valve 160. In order to retain the lever in open position until the rocker arm has made sufficient stroke to effect turning of the group of pans, the rocker arm carries a cam segment 164 having a track 165 that moves into position to engage a lug 166 on the lever arm to hold the lever arm in retracted or valve opening position until the pans have moved into the dotted line position shown in Fig. 6 and ready to tip onto the offtake conveyer. In this position the track 165 has passed the lug 166 on the lever arm 163 so that the lever arm is free to swing forwardly. When the arcuate arms of the rock shaft swing downwardly the cam segment moves on the retractive side of the lug.

It is thus obvious that as long as the valve operating lever is retained in retracted position by the cam, the air cylinder is effective in making a full stroke of the piston to complete turning of a group of pans later described. The mechanism is restored to original position by gravity and ready to turn the next group of pans when they move in position to engage the actuating lever of the valve.

In using the apparatus constructed and assembled as described, pans are placed in inverted position on the table 14 and pushed over the air discharge nozzles onto the conveyer belt 15. As the pans pass the air discharge nozzles 31, jets of air are blown therein to dislodge any foreign matter such as crumbs and the like from a previous baking. The pans are carried by the belt 15 to the pan coating station where grease, such as melted lard, is sprayed into the interior thereof as shown in Fig. 2. As the pans approach the coating station they engage one of the arms 100 to rotate the wheel 99 to cause the cam 104 connected therewith to actuate the lever 106 of the air valve 107 which connects the air supply with the air cylinder 111. Upon admission of the air, the piston within the cylinder moves against action of the spring 115 to cause the plunger 88 to expel a charge of the coating material through the tube 97 to the spray nozzle. As the pressure builds up in the spray nozzle, the spring 58 yields and the valve opens to discharge the spray liquid under high pressure and velocity through the orifices 76 and 77 of the nozzle 65. The jets escape from the orifices and impinge against each other to effect a finely atomized spray capable of substantially reaching all of the interior surfaces of the pan that is then in position.

When the air valve is closed incidental to release of the lever 106 by advancement of the pans, the air in the cylinder 111 vents to atmosphere and the spring 115 returns the plunger 88 to retracted position, producing a sufficient suction to draw another charge of coating material from the tank 38 through the pipe 90. As the pans reach the conveyer chains 134 and 135, they are carried thereby over the pan turning mechanism.

When the endmost pan engages the lever 163 the lever is moved retractively to open the valve 160 and discharge air into the cylinder 148 which effects rocking of the shaft 147 to cause the arcuate arms 155 and 156 and connecting bar 157 to move upwardly through and tip the pan or group of pans lying thereover into the position shown by the dotted lines, Fig. 6. The pans riding upon the rail 159, overbalance and move into an upright position onto the conveyer 160 which carries the pans in vertical position to the filling station.

The machine is readily adapted to pans of different size by adjusting the position of the guide rail 123 relative to the guide rail 100. This is effected by loosening the clamp screws 129 and 130 and sliding the supporting sleeves 125 and 127 along the cross rails 126 and 128. When this adjustment is made it is desirable to adjust the pan 41 to center the spray nozzle relative to the pans as they are moved thereacross. This is readily effected by manipulation of the hand wheel 133.

In order to conserve grease and prevent possible discharge of spray between the inverted pan and the grease collecting pan, the grease collecting pan may substantially conform to the width of the pans being greased (see Fig. 9) and hinged flaps 167 and 168 are provided on the incoming and outgoing sides of the pan to close the open spaces. The flaps are hinged as at 169 and 170 to the transverse walls of the grease collecting pan and are yieldingly retained in position by springs 171 and 171'. The flaps are yieldable with movement of the pans transversely across the spray nozzle, but when a pan is centered over the nozzle the flaps spring into position to close the openings as shown in Fig. 9.

In the form of the invention shown in Fig. 10, the heater is separate from the storage tank. The grease is stored in a tank 172 and heated only sufficiently to maintain fluidity thereof. The grease flows by gravity from the storage tank 172 through a pipe 173 to a separate heating cylinder 174 that is heated by an electrical heating element 175. The heating cylinder 174 is provided with a thermostat element 176 immersed in the grease and adjusted to a predetermined temperature by the manipulation of a knob 177. The cylinder has a drain valve 178 in the bottom thereof and an air vent 179 in the top controlled by a valve 180. The grease at the desired temperature is drawn from the cylinder through a pipe 181 connected with a cylinder 182 of a pump 183. The pump cylinder has a piston chamber 184 normally closed at one end by a series of valves 185 arranged in tandem. A rod-like piston 186 is reciprocated in the piston chamber and carries a larger piston 186' that is reciprocable in an air cylinder 187 connected with the cylinder 182 as shown. Air is admitted into the cylinder from a valve similar to the pan actuated valve 107 of the first described form of the invention through a pipe 188. The piston is returned to normal position by a coil spring 189 bearing against the end of the air cylinder and having its opposite end seated on a spring seat 190 carried by a piston rod extension 191. The discharge end of the cylinder 182 is connected by a duct 192 leading to the spray nozzle 193 corresponding to the spray nozzle mechanism previously described. The inlet to the pipe 173 may be provided with a substantially cylindrical screen 194.

In order to prevent an air lock above the air piston, the air cylinder is provided with a vent 195. When air is introduced through the pipe 188 that is connected with the inlet port of the air cylinder, the air piston 186' actuates the rod-like piston 186 to force the liquid in the cylinder past the valves 185 and discharge it through the spray nozzle mechanism 193 substantially in the manner of the pump previously described.

When the air is suspended the pistons are returned to normal position by the spring 189, air being admitted to the air cylinders through the vent 195. In this form of the invention, the grease is heated to high temperature only as it is used, thereby maintaining the grease in storage in better condition.

What I claim and desire to secure by Letters Patent is:

1. An apparatus of the character described including means for supporting pans in inverted position, a spray nozzle for discharging coating material into the pans, means for conveying the pans along said supporting means and across the spray nozzle in successive order, a pump for delivering measured amounts of coating material under pressure to the nozzle, an air operated actuator for said pump, a rotor supported above the pans, arms on the rotor engageable by the pans to advance said rotor, a cam connected with the rotor, a valve for controlling air supply to the actuator, and an arm on the valve and in position to be engaged by the cam for effecting opening of the valve to supply the actuator when a pan registers with the spray nozzle.

2. In an apparatus of the character described, a spray nozzle for discharging the coating material into the interior of pans to be coated, means for conveying the pans in inverted position across the nozzle in successive order, a pump for delivering measured amounts of coating material to the nozzle, an actuator for said pump, a wheel, radial arms on said wheel, means for supporting the wheel with the arms in the path of the pans to effect turning of the wheel as the pans are moved over said nozzle, a source of compressed air connected with the actuator, a valve controlling said air supply, a cam driven by said wheel, and a lever on the valve engageable with the cam for operating the valve to effect actuation of the actuator.

3. In an apparatus of the character described, a support, means for conveying inverted pans along the support, a spray nozzle on the support and arranged to discharge a liquid coating material into the pans, a pump for discharging a quantity of the liquid coating material under pressure, duct means connecting the pump with the spray nozzle for conveying the liquid coating material under pressure of the pump, and a spring loaded valve in said duct means actuated by the pressure of the liquid coating for maintaining pressure on said coating material.

4. In an apparatus of the character described, a support, means for conveying inverted pans along the support, a spray nozzle on the support and arranged to discharge a liquid coating material into the pans, a pump for discharging a quantity of the liquid coating material under pressure, duct means connecting the pump with the spray nozzle for conveying the liquid coating under pressure of the pump, a spring loaded valve in said duct means actuated by the pressure of the liquid coating for maintaining pressure on said coating material, an air actuator for said pump, and means for effecting operation of the actuator responsive to movement of the pans.

IRVING M. ARCHER.

REFERENCES CITED

The following references are of record in the file of this patent:

UNITED STATES PATENTS

| Number | Name | Date |
|---|---|---|
| 1,295,762 | Koenig et al | Feb. 25, 1919 |
| 1,363,013 | Puhl | Dec. 21, 1920 |
| 1,724,643 | Debus | Aug. 13, 1929 |
| 1,850,837 | Hatch | Mar. 22, 1932 |
| 1,887,138 | Peffer | Nov. 8, 1932 |
| 1,917,767 | Larson | July 11, 1933 |
| 2,267,491 | Burkhart | Dec. 23, 1941 |
| 2,344,461 | Hermani | Mar. 14, 1944 |
| 2,350,708 | Rosenlund | June 6, 1944 |
| 2,356,120 | Slightman | Aug. 15, 1944 |